United States Patent [19]

Neinast et al.

[11] Patent Number: 4,999,472

[45] Date of Patent: Mar. 12, 1991

[54] ELECTRIC ARC SYSTEM FOR ABLATING A SURFACE COATING

[76] Inventors: James E. Neinast, 5200 Carmel Park Dr., Charlotte, N.C. 28226; Mark E. Neinast, 1915 Laurel La., Gastonia, N.C. 28054

[21] Appl. No.: 491,974

[22] Filed: Mar. 12, 1990

[51] Int. Cl.$^5$ .............................................. B23K 9/00
[52] U.S. Cl. ................................ 219/56.22; 219/56.21
[58] Field of Search ........................... 219/56.21, 56.22; 228/4.5, 5.1, 5.7

[56] References Cited

U.S. PATENT DOCUMENTS

| | | | |
|---|---|---|---|
| 4,594,493 | 6/1986 | Harrah et al. | 219/56.22 |
| 4,671,848 | 6/1987 | Miller et al. | 219/121.85 |
| 4,909,427 | 3/1990 | Plaisted et al. | 228/4.5 |
| 4,950,866 | 8/1990 | Kojima et al. | 219/56.22 |

Primary Examiner—Clifford C. Shaw
Attorney, Agent, or Firm—Clifton Ted Hunt

[57] ABSTRACT

An electrical arc system for ablating a portion of a surface coating from an electrically conductive wire along a selected cut-off line within a tolerance on the order of 0.001 of an inch. The arc is generated by electrodes insulated from each other inwardly beyond the selected cut-off line and arranged obliquely to the cut-off line and to the axis of the coated wire.

4 Claims, 1 Drawing Sheet

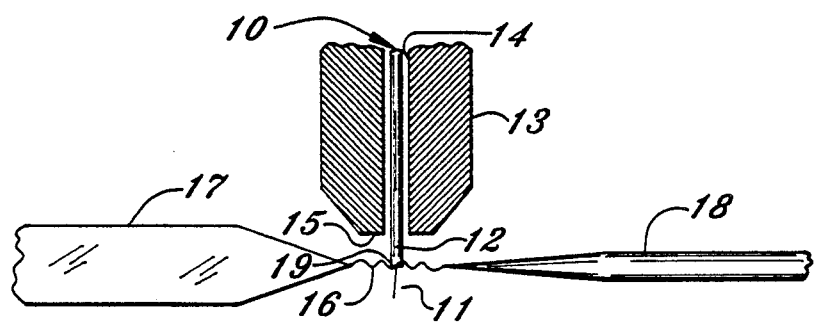
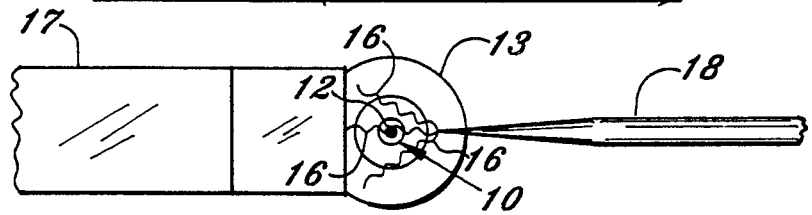
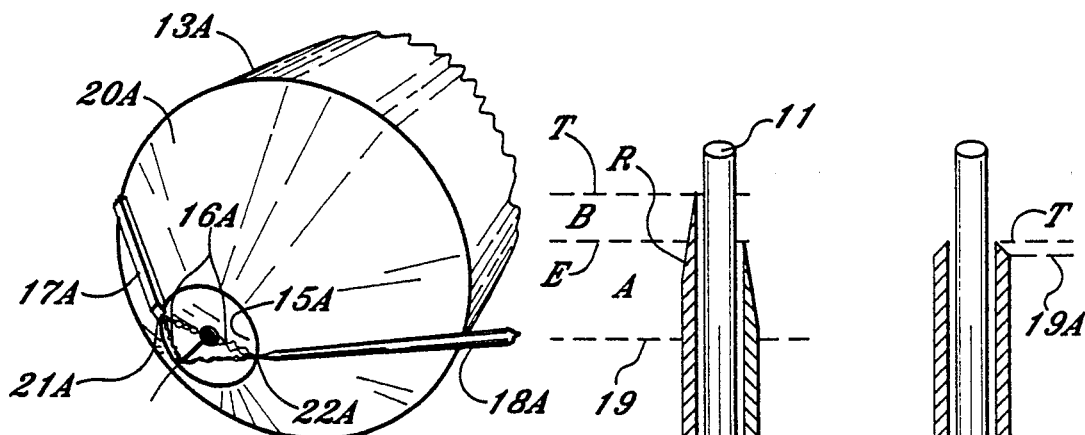
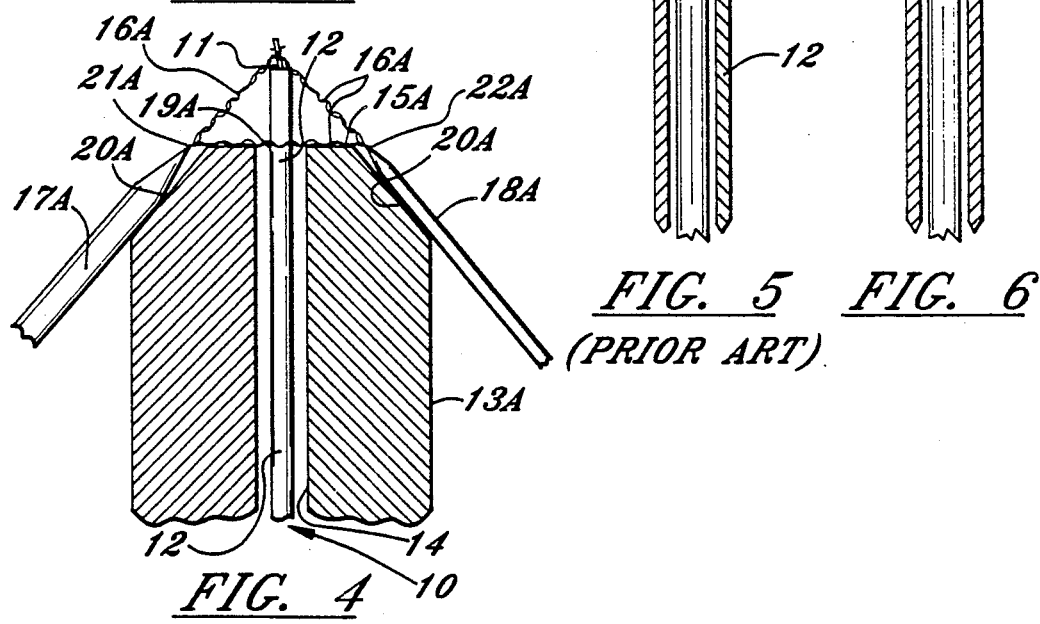

ELECTRIC ARC SYSTEM FOR ABLATING A SURFACE COATING

FIELD OF THE INVENTION

This invention relates to the removal of surface coatings. The illustrated embodiment is described as the removal of a dielectric coating from a conducting material used in microelectronics.

BACKGROUND OF THE INVENTION

In microelectronics, interconnections between different parts of circuitry are often made with wires, or conductive material, having a diameter in the range of 0.001 to 0.002 inches and coated with a correspondingly thin enamel coating for insulation. The enamel coating is also beneficial in providing desirable mechanical strength to the thin wire.

Removal of the enamel coating along a specified length from the ends of each wire is necessary before forming the interconnections comprising the circuitry. The removal is difficult. The small diameter of the wire and the thinness of its enamel coating are physical obstacles to the efficient handling of the tiny wires while the insulation is removed. The difficulty in removing the insulation is compounded by the capacity of the enamel coating to strongly adhere to the wire, which minimizes the inadvertent removal of the coating.

Another significant factor contributing to the difficulty of removing the enamel coating is that the ablation must be sufficiently complete to provide a surface on the conductor that will reliably enable an electrical coupling with another conducting material.

It is known in the prior art to remove the insulation mechanically, with abrasives; chemically, with solvents; and electrically, with either an electric arc between electrodes or with a laser. There are objections to all of these known techniques. Abrasive methods are time consuming and present a high risk of mechanical damage to the conductors. The use of chemicals undesirably involves the use of toxic materials and the increasingly burdensome and expensive problem of disposing of toxic waste. The results obtained with either chemicals or abrasives are generally inferior to the results obtained electrically with either the prior art electric arc system or lasers. Ablation by laser is effective but generally economically unfeasible.

Ablation with an electrical arc presents less problems than the other known techniques for removing the dielectric coating from conductive materials. It is quick, inexpensive, and is capable of being used with little risk of damage to the conductive material. However, ablation with an electrical arc, as known in the prior art, lacks desirable efficiency because it frequently leaves an irregular residue of the insulation on the conductive wire, which prevents the reliable establishment of an effective electrical connection when installed in a circuit.

The industry has established a standard tolerance of 0.020 of an inch beyond the desired cut-off line, within which there may be residues of the coating or insulation. In other words, the industry recognizes that ablation of the end portions of a coated wire with the use of either an abrasive, a chemical, or an electrical arc inherently leaves a jagged or irregular line of cut or a spattered area of ablation with fragments of the dielectric coating adhering to the conductive material 0.020 of an inch, or further, from the desired cut-off line. The tolerance of up to plus or minus 0.020 of an inch is acceptable, but not desirable, because that is the closest tolerance the industry has been able to reliably achieve with the existing technology, other than some laser techniques.

U.S. Pat. No. 4,671,848, issued June 9, 1987 to General Laser, Inc. of Phoenix, Arizona for METHOD FOR LASER-INDUCED REMOVAL OF A SURFACE COATING tells the advantage of ablating by laser and describes the shortcoming in the use of an electric arc for ablation of a coating.

The laser induced removal of a dielectric coating on a fine gauge wire used in microelectronics is effective to make a clean cut without the inherent residue of the prior art electric arc system for ablation, but there is a high risk of damaging the underlying conductor with the typical laser process, and use of laser is generally awkward and effective only in low yield production.

SUMMARY OF THE INVENTION

The present invention provides a unique electric arc system wherein the electrodes are arranged in a novel manner to effectively ablate an enamel insulation coating from a conductive wire along an exact cut-off line or within a narrow zone between insulated and non-insulated sections of a wire conductor.

Specifically, the tolerance for residual fragments of insulation coating may be realistically only 0.002 of an inch with the novel electric arc system of this invention, or about 1/10th of the 0.020th of an inch tolerance now recognized for ablation with the electric arc system of the prior art. A tolerance of 0.002 is comparable to the typical result achieved by laser-induced removal of the coating but, without the risk and expense of using laser.

Basically, this desirable result is accomplished by insulating the electrodes from each other inwardly of the selected cutoff line and arranging the electrodes obliquely to the cut-off line and to the axis of the wire. The perpendicular arrangement of the prior art resulted in a spattering of the arc against the dielectric coating and a consequently spattered zone of ablation. The oblique arrangement of the electrodes according to this invention results in a clean cut line of ablation with minimal spattering.

BRIEF DESCRIPTION OF THE DRAWINGS

FIG. 1 is a schematic top plan view illustrating the opposed relation of the electrodes and the perpendicular arcing arrangement of the prior art;

FIG. 2 is a front view of the prior art arrangement of FIG. 1;

FIG. 3 is a fragmentary perspective view looking at the front and one side of the oblique arcing arrangement of the invention;

FIG. 4 is an enlarged fragmentary sectional view of the arcing arrangement shown in FIG. 3;

FIG. 5 is an enlarged sectional view, with parts broken away, of a length of wire with its dielectric coating and illustrating typical zones of residue remaining on a wire after ablation of insulation by use of the prior art perpendicular arcing arrangement illustrated in FIGS. 1 and 2; and FIG. 6 is an enlarged sectional view similar to FIG. 5, but illustrating the relatively straight and clean line of ablation and the reduced zone of residue remaining on a wire after ablation by the novel arcing system illustrated in FIGS. 3 and 4.

DETAILED DESCRIPTION OF THE ILLUSTRATED EMBODIMENT

Although the invention is described as being useful in the field of microelectronics, its utility is not limited to microelectronics, but may be used wherever it is desired to ablate material with a clean line of cut.

THE PRIOR ART

FIGS. 1 and 2 illustrate the perpendicular arcing system used in the prior art for ablating the end portions of a dielectric coating or insulation from conductive material or wire of the type used in microelectronics. FIG. 5 illustrates a typically irregular zone of ablation obtained by the prior art perpendicular arcing system.

According to the prior art as illustrated in FIGS. 1 and 2, an insulated wire, broadly indicated at 10 and comprising conductive material or wire 11 and a dielectric coating or insulation 12, is supported in an insulation guide 13 formed of glass or the like and having a passageway 14 which loosely receives the wire 10. One end portion of the insulated wire 10 protrudes beyond the end 15 of the guide 13 and across the path of an electrical arc 16 which periodically extends between opposed electrodes 17 and 18. The arc 16 ablates the coating 12 from the protruding end portion of the wire 10, beginning at a selected cutoff point 19 spaced inwardly a desired distance, such as 0.0015 to 0.0040 of an inch from the terminal end of the wire.

As illustrated in FIGS. 1 and 2, the arc 16 does not extend only in a straight line between the two electrodes 17 and 18. The arc 16 dances along the length of the wire 11 in FIG. 1 and dances circumferentially around the wire in FIG. 2. Consequently the arc strikes against the wire and ablates the coating 12 on both sides of the desired cut-off point, indicated at 19.

The result is a jagged remnant of insulation illustrated in FIG. 5 by the zones A and B defined by a dotted line 19 representing the end of the full thickness insulation at the desired cut-off line, a dotted line E at the tapered end of one portion of the jagged insulation, and a dotted line T at the total end of the jagged insulation. Zone A represents the slope of the insulation from full thickness to zero thickness, and the combination of Zones A and B represent the total length of the residue of jagged insulation beyond the desired cut-off line 19. The remnants of insulation and the long taper at the terminal end of the insulation undesirably prevent a reliably effective electrical connection in a circuit.

THE INVENTION

Referring to FIGS. 3 and 4, an insulation guide 13A is used, as in the prior art, to support the insulated wire 10 with the portion of the wire to be ablated extending beyond the end 15A of the guide. The electrodes 17A and 18A in FIGS. 3 and 4 are not opposed to each other to direct an arc perpendicularly of the axis of the wire 10, as are the electrodes 17 and 18 in FIGS. 1 and 2.

Instead, the electrodes 17A and 18A in FIGS. 3 and 4 are supported on inclined wall 20A of insulation guide 13A with their tips 21A and 22A positioned on the selected cut-off line 19A defined by the end wall 15A of the guide 13A.

When the electrodes are energized, the resulting arc 16A initially strikes the wire or conductor 11 at the terminal end of the coated wire 10 normally spaced about 0.015 to 0.020 of an inch beyond the wall 15A of the insulation guide 13A. The heat generated by the impact of the arc 16A with the wire 11 ablates a portion of the coating near the terminal end of the coated wire 10, exposing more of the wire 11 to the arc 16A. The arc 16A travels quickly along the coated wire 10 toward the wall 15A of the insulation guide 13A and effortlessly and cleanly ablates the coating or insulation 12 as it moves. Only a portion of the insulation is shown to have been removed in FIGS. 3 and 4 for the purpose of illustration.

The insulation guide 13A stabilizes the arc 16 and prevents it from contacting the portion of the insulated wire 10 within the insulation guide. All of the enamel coating 12 on the protruding end portion of the wire 10 is ablated, leaving a clean cut-off line coinciding with the plane of the wall 15A.

The residue of insulation remaining on the wire 11 after ablation by the improved electric arc system of this invention is on the order of 10 times less than the amount of residue remaining on the wire after ablation by the prior art electrical arc system. For example, it has been found in actual practice that the residue of enamel coating on the wire 11 is sometimes confined to 0.001 of an inch beyond the desired cut-off line 19A.

FIG. 6 illustrates the zone of residue remaining on the wire 11 following ablation of its coating 12. In FIG. 6, the tapered terminal end of the coating 12 beyond the selected cutoff line 19A lies in the zone between the cut-off line 19A and the total end of the insulation, indicated by the dotted line T in FIG. 6. The zone of residue between the lines 19A and T in FIG. 6 corresponds to the prior art zone of residue lying in the combination of zones A and B in FIG. 5, yet the distance between lines 19A and T in FIG. 6 may measure no more than 0.001 of an inch.

The dimensions of the end wall 15A and the angularity of the inclined wall 20A are not critical. Similarly, the frequency and magnitude of the electrical arc is not critical. Ablating arc voltage is in the range of 20 kV. In actual practice, an end wall 15A measuring 0.125 of an inch and an inclined wall 20A extending at an angle of 45° from the end wall 15A have produced excellent results using enlarged electrode 17A as a primary, and with the electrical system operating at a frequency of 1350 hertz with off-pulse-time of 45 microseconds and a voltage of 20 kV.

It is an important feature of the invention that the electrodes 17A and 18A not be opposed to each other, but be insulated from each other and arranged obliquely to the axis of the wire 10 with their tips not extending beyond the end wall 15A of the insulating guide 13A. So arranged, the arc 16 will travel only outwardly of the selected cut-off line 19A defined by the insulative wall 15A, resulting in a clean cut, comparable to that made with a laser.

There is thus provided an apparatus and method of using an electrical arc to cleanly and effectively ablate a coating along a selected cut-off line.

Although specific terms have been employed in describing the invention, they have been used in a generic and descriptive sense only and not for the purpose of limitation.

We claim:

1. An electrical arc system for ablating a portion of a surface coating from an electrically conductive wire along a selected cut-off line, said system comprising a pair of spaced apart electrodes and means for generating an arc between corresponding ends of the electrodes, electrically insulative means defining said selected cut-off line and supporting the coated wire perpendicularly across and outwardly of the selected cut-off line and between said corresponding ends of the electrodes, means supporting the electrodes obliquely to the selected cutoff line and obliquely to the axis of the wire, and means insulating the electrodes from each other inwardly beyond the selected cut-off line, whereby the surface coating is ablated cleanly along the cut-off line and outwardly therefrom along the wire when an ablating arc voltage is delivered to the electrodes.

2. An electrical arc system according to claim 1 wherein a heat resistant and non-conductive insulation guide defines the selected cut-off line, supports the coated wire perpendicularly across and outwardly of the selected cut-off line and between said corresponding ends of the electrodes, supports the electrodes obliquely to the selected cut-off line and obliquely to the axis of the wire, and insulates the electrodes from each other inwardly beyond the selected cut-off line.

3. An electrical arc system according to claim 1 wherein one electrode is larger that the other electrode to act as a primary.

4. A method of cleanly ablating a portion of a surface coating along a selected cut-off line with an electrical arc system having two electrodes and means for generating an ablating arc between the electrodes, said method comprising:
   (a) defining the selected cut-off line with one wall of an insulative block;
   (b) arranging the electrodes obliquely to the selected cut-off line;
   (c) electrically insulating the electrodes from each other beyond the selected cut-off line;
   (d) positioning the portion of the coating to be ablated across the selected cut-off line and between the electrodes; and
   (e) generating an ablating arc between the electrodes, whereby the surface coating is ablated cleanly along the selected cut-off line.

* * * * *